(12) United States Patent
Pandey et al.

(10) Patent No.: US 9,264,553 B2
(45) Date of Patent: Feb. 16, 2016

(54) METHODS AND APPARATUSES FOR ECHO CANCELATION WITH BEAMFORMING MICROPHONE ARRAYS

(75) Inventors: Ashutosh Pandey, Murray, UT (US); Darrin T. Thurston, Liberty, UT (US); David K. Lambert, South Jordan, UT (US); Tracy A. Bathurst, South Jordan, UT (US)

(73) Assignee: ClearOne Communications, Inc., Salt Lake City, UT (US)

( * ) Notice: Subject to any disclaimer, the term of this patent is extended or adjusted under 35 U.S.C. 154(b) by 723 days.

(21) Appl. No.: 13/493,921

(22) Filed: Jun. 11, 2012

(65) Prior Publication Data

US 2013/0039504 A1    Feb. 14, 2013

Related U.S. Application Data

(60) Provisional application No. 61/495,961, filed on Jun. 11, 2011, provisional application No. 61/495,968, filed on Jun. 11, 2011, provisional application No. 61/495,971, filed on Jun. 11, 2011.

(51) Int. Cl.
*H04B 3/20* (2006.01)
*H04M 9/08* (2006.01)
*H04B 15/00* (2006.01)

(52) U.S. Cl.
CPC .................................... *H04M 9/082* (2013.01)

(58) Field of Classification Search
CPC .... H04R 3/005; H04R 2430/20; H04R 1/406; H04M 9/082; H04M 9/08
USPC ........... 381/66, 71.1, 93; 379/406.01–406.16; 348/14.01
See application file for complete search history.

(56) References Cited

U.S. PATENT DOCUMENTS

| 8,019,091 | B2 | 9/2011 | Burnett et al. | |
|---|---|---|---|---|
| 2004/0013038 | A1* | 1/2004 | Kajala | G01S 3/043 367/119 |
| 2006/0233353 | A1 | 10/2006 | Beaucoup et al. | |
| 2007/0093714 | A1* | 4/2007 | Beaucoup | H04M 9/085 600/437 |
| 2009/0087000 | A1 | 4/2009 | Ko | |
| 2010/0128892 | A1 | 5/2010 | Chen et al. | |
| 2010/0131749 | A1 | 5/2010 | Kim et al. | |
| 2010/0189275 | A1* | 7/2010 | Christoph | H04R 3/005 381/66 |
| 2012/0128175 | A1* | 5/2012 | Visser et al. | 381/92 |
| 2012/0182429 | A1 | 7/2012 | Forutanpour et al. | |
| 2012/0288079 | A1* | 11/2012 | Burnett et al. | 379/202.01 |

* cited by examiner

*Primary Examiner* — Vivian Chin
*Assistant Examiner* — Ammar Hamid
(74) *Attorney, Agent, or Firm* — TraskBritt

(57) ABSTRACT

Embodiments include methods and apparatuses for sensing acoustic waves for a conferencing application. A conferencing apparatus includes a plurality of microphones oriented to cover a corresponding plurality of direction vectors and to develop a corresponding plurality of microphone signals. A processor is operably coupled to the plurality of microphones. The processor is configured to perform a beamforming operation to combine the plurality of microphone signals to a plurality of combined signals that is greater in number than one and less in number than the plurality of microphone signals. The processor is also configured perform an acoustic echo cancelation operation on the plurality of combined signals to generate a plurality of combined echo-canceled signals and select one of the plurality of combined echo-canceled signals for transmission.

20 Claims, 10 Drawing Sheets

METHODS AND APPARATUSES FOR ECHO CANCELATION WITH BEAMFORMING MICROPHONE ARRAYS

CROSS-REFERENCE TO RELATED APPLICATIONS

This application claims the benefit of: U.S. Provisional Patent Application Ser. No. 61/495,971, filed Jun. 11, 2011 and entitled "Beamforming Microphone Array for Telepresence Application," U.S. Provisional Patent Application Ser. No. 61/495,961, filed Jun. 11, 2011 and entitled "Combining a Beamforming Microphone Array With an Acoustic Echo Canceller for Teleconferencing Applications," and U.S. Provisional Patent Application Ser. No. 61/495,968, filed Jun. 11, 2011 and entitled "Combining a Beamforming Microphone Array With an Acoustic Echo Canceller for Teleconferencing Applications," the disclosures of each of which are incorporated herein in their entirety by this reference.

TECHNICAL FIELD

Embodiments of the present disclosure relate generally to methods and apparatuses for beamforming microphone arrays. More specifically, embodiments of the present disclosure relate to methods and apparatuses with echo cancelation in beamforming microphone arrays.

BACKGROUND

In a typical telepresence application, such as, for example, teleconferencing, a loudspeaker may be located on top, bottom or side of a television set, a microphone may be located in line with the television set and a participant sits in line with a television for the audio conferencing part of it.

Many improvements have been made in teleconferencing and video conferencing systems, which may use microprocessors and software to accomplish a wide variety of system tasks and signal processing algorithms to improve on, compress, and even encrypt video and audio streams. Some teleconferencing applications may include multiple microphones in an array to better capture acoustic patterns of a room and the participants in the room. However, arrayed microphones can cause their own problems with duplicate coverage and echoing.

There is a need for methods and apparatuses to improve on the acoustic quality of microphone arrays with echo cancelation and a need to perform this echo cancelation efficiently.

BRIEF SUMMARY

Embodiments of the present disclosure include methods and apparatuses to improve the acoustic quality of microphone arrays with echo cancelation and perform this echo cancelation efficiently.

Embodiments of the present disclosure include a method of echo cancellation for a conferencing application. The method includes sensing acoustic waves with a plurality of microphones to develop a corresponding plurality of microphone signals. A beamforming operation is performed to combine the plurality of microphone signals to a plurality of combined signals that is greater in number than one and less in number than the plurality of microphone signals. An acoustic echo cancelation operation is performed on the plurality of combined signals to generate a plurality of combined echo-canceled signals and one or more of the plurality of combined echo-canceled signals is selected for transmission.

Embodiments of the present disclosure include a conferencing apparatus. A plurality of microphones are oriented to cover a plurality of direction vectors and to develop a corresponding plurality of microphone signals. A processor is operably coupled to the plurality of microphones. The processor is configured to perform a beamforming operation to combine the plurality of microphone signals to a plurality of combined signals that is greater in number than one and less in number than the plurality of microphone signals. The processor is also configured perform an acoustic echo cancelation operation on the plurality of combined signals to generate a plurality of combined echo-canceled signals and select one or more of the plurality of combined echo-canceled signals for transmission.

Embodiments of the present disclosure include a conferencing apparatus with a beamforming microphone array. Each microphone of the beamforming microphone array is configured to sense acoustic waves from a direction vector substantially different from other microphones in the beamforming microphone array. A memory is configured for storing computing instructions. A processor is operably coupled to the beamforming microphone array and the memory. The processor is configured to execute the computing instructions to perform a beamforming operation to combine the plurality of microphone signals to a plurality of combined signals that includes a number of signals between one and a number of signals in the plurality of microphone signals. The processor is also configured to execute the computing instructions to perform an acoustic echo cancelation operation on the plurality of combined signals to generate a plurality of combined echo-canceled signals.

DETAILED DESCRIPTION

Figure 1:
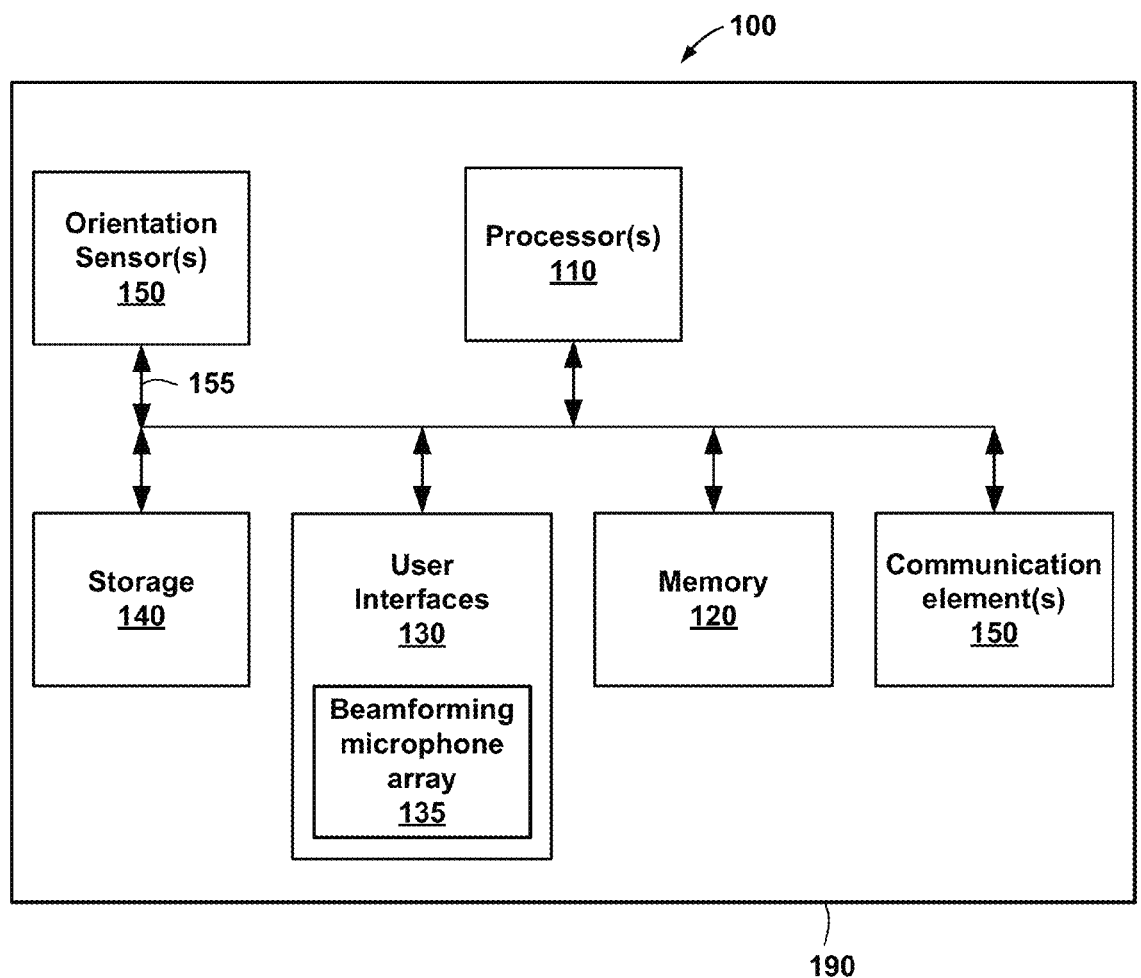
FIG. 1 is a block diagram illustrating a conferencing apparatus according to one or more embodiments of the present disclosure.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
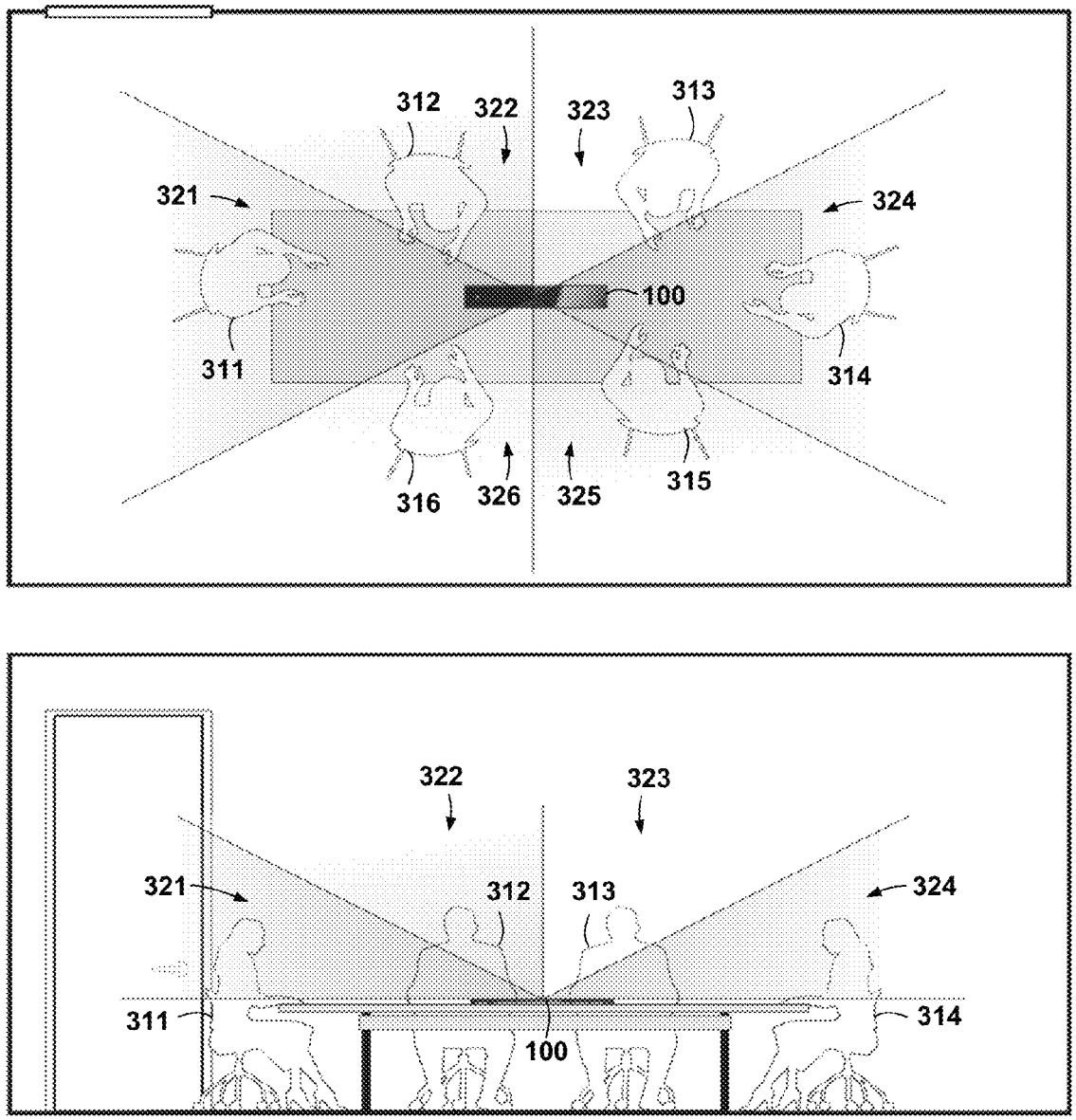
FIG. 3 illustrates a top view and a side view of a conference room including participants and a conferencing apparatus disposed on a table and illustrating beams that may be formed by a beamforming microphone array disposed in the conferencing apparatus.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include methods and apparatuses to improve the acoustic quality of microphone arrays with echo cancellation and to perform this echo cancelation efficiently.

FIG. 1 illustrates a conferencing apparatus 100 for practicing embodiments of the present disclosure. The conferencing apparatus 100 may include elements for executing software applications as part of embodiments of the present disclosure. Thus, the system 100 is configured for executing software programs containing computing instructions and includes one or more processors 110, memory 120, one or more communication elements 150, and user interface elements 130. The system 100 may also include storage 140. The conferencing apparatus 100 may be included in a housing 190.

The one or more processors 110 may be configured for executing a wide variety of applications including the computing instructions for carrying out embodiments of the present disclosure.

The memory 120 may be used to hold computing instructions, data, and other information for performing a wide variety of tasks including performing embodiments of the present disclosure. By way of example, and not limitation, the memory 120 may include Synchronous Random Access Memory (SRAM), Dynamic RAM (DRAM), Read-Only Memory (ROM), Flash memory, and the like.

Information related to the system 100 may be presented to, and received from, a user with one or more user interface elements 130. As non-limiting examples, the user interface elements 130 may include elements such as displays, keyboards, mice, joysticks, haptic devices, microphones, speakers, cameras, and touchscreens.

The communication elements 150 may be configured for communicating with other devices or communication networks. As non-limiting examples, the communication elements 150 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols.

The storage 140 may be used for storing relatively large amounts of non-volatile information for use in the computing system 100 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), and other equivalent storage devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be stored on the storage 140, transferred to the memory 120 for execution, and executed by the processors 110. The processor 110, when executing computing instructions configured for performing the processes, constitutes structure for performing the processes and can be considered a special-purpose computer when so configured. In addition, some or all portions of the processes may be performed by hardware specifically configured for carrying out the processes.

In some embodiments, an orientation sensor 150 may be included. As a non-limiting example, accelerometers configured to sense acceleration in at least two substantially orthogonal directions may be used. As another non-limiting example, a multi-axis accelerometer may be used. Of course, other types of position sensors may also be used, such as for example magnetometers to sense magnetic fields of the Earth.

Single- and multi-axis models of accelerometers may be used to detect magnitude and direction of the proper acceleration (i.e., g-force), and can be used to sense orientation. Orientation can be sensed because gravity acting on the accelerometers can detect direction of weight changes. The proper acceleration measured by an accelerometer is the acceleration associated with the phenomenon of weight experienced by any mass at rest in the frame of reference of the accelerometer device. For example, an accelerometer can measure a value of "g" in the upward direction when remaining stationary on the ground, because masses on the Earth have weight (i.e., mass*g). Another way of stating this phenomenon is that by measuring weight, an accelerometer measures the acceleration of the free-fall reference frame (i.e., the inertial reference frame) relative to itself.

One particular type of user interface element 130 used in embodiments of the present disclosure is a plurality of microphones 135, which can be configured as a beamforming microphone array 135.

Thus, accelerometers mounted in the housing 190 can be used to determine the orientation of the housing 190. With the beamforming microphone array 135 also mounted in the housing 190, the orientation of the beamforming microphone array 135 is easily determined because it is in a fixed position relative to the housing.

Microphones are often used in a teleconference to capture participant's audio. In a teleconference, microphones are usually placed on a table or hanged from ceiling and are manually positioned so that a participant audio is in the pick-up pattern of the microphone. Since, pick-up patterns of these microphones are fixed, more often than not one type of microphone, say a tabletop microphone, may not work for another type of installation, say a ceiling installation. Thus, an installer may need to know the type of installation (e.g., tabletop or ceiling), angle of participant's relative to the microphones, and the number of participants before installing a correct set of microphones.

In some embodiments of the present disclosure, the conferencing apparatus 100 uses a beamforming microphone array 135 that can be installed in a number of positions and configuration and beams for the microphones can be adjusted with base level configurations or automatically and adaptively bring participants into the pick-up pattern of the beamforming microphone array 135 based on the orientation and placement of the conferencing apparatus 100.

Microphones may be used in conferencing applications to perform spatial filtering to improve audio quality. These microphones have a beam pattern that selectively picks up acoustic waves in a region of space and rejects others.

Figure 2:
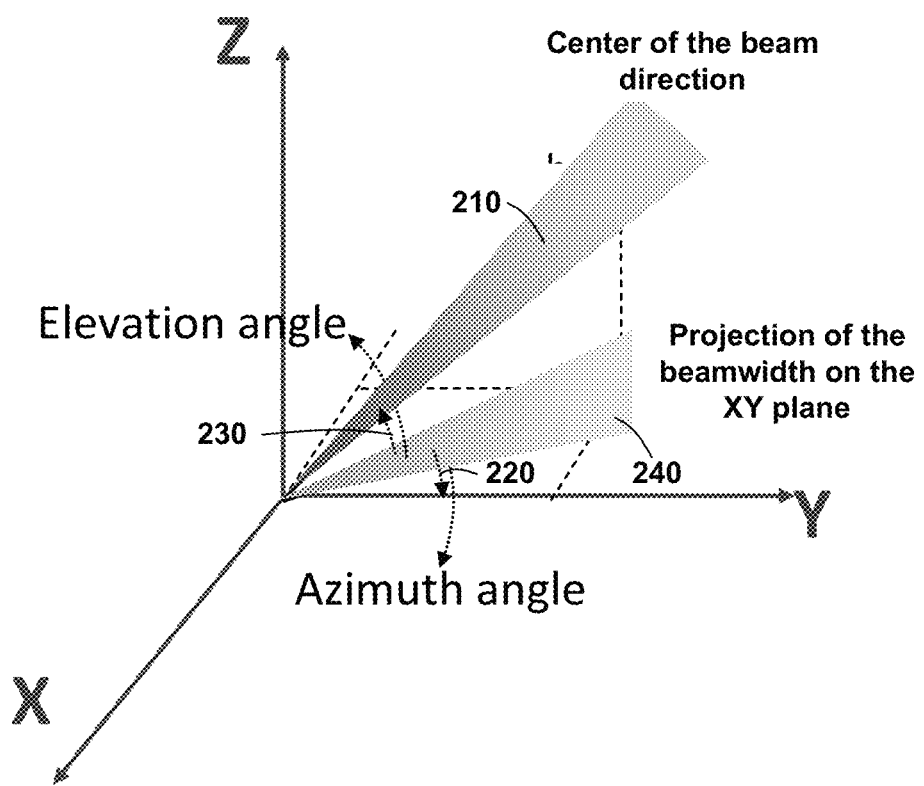
FIG. 2 illustrates geometrical representations of a beam for a microphone.

FIG. 2 illustrates geometrical representations of a beam for a microphone. A direction vector 210 of the beam extends from the microphone. The beam pattern for a microphone is usually specified with an azimuth angle 220, an elevation angle 230, and a beamwidth 240. Of course, the beamwidth 240 will have a three-dimensional quality to it and FIG. 2 illustrates a projection of the beam width 240 onto the X-Y plane. Not only should a participant face a microphone, the location of the participant's mouth relative to the microphone should be in the beam pattern as well for good quality of the participant's audio.

Beamforming is a signal processing technique carried out by the processor 110 using input from the beamforming microphone array 135. Various signal-processing characteristics of each of the microphones in the beamforming microphone array 135 may be modified. The signals from the various microphones may be combined such that that signals at particular angles experience constructive interference while others experience destructive interference. Thus, beamforming can be used to achieve spatial selectivity such that certain regions can be emphasized (i.e., amplified) and other regions can be de-emphasized (i.e., attenuated). As a non-limiting example, the beam-forming processing may be configured to attenuate sounds that originate from the direction of a door to a room.

Beamforming may use interference patterns to change the directionality of the array. In other words, information from the different microphones may be combined in a way where the expected pattern of radiation is preferentially observed. Beamforming techniques may involve combining delayed signals from each microphone at slightly different times so that every signal reaches the output at substantially the same time.

Moreover, signals from each microphone may be amplified by a different amount. Different weighting patterns may be used to achieve the desired sensitivity patterns. As a non-limiting example, a main lobe may be produced together with nulls and sidelobes. As well as controlling the main lobe width (the beam) and the sidelobe levels, the position of a null can be controlled. This is useful to ignore noise in one particular direction, while listening for events in other directions. Adaptive beamforming algorithms may be included to automatically adapt to different situations.

Embodiments of the present disclosure include a beamforming microphone array, where elevation angle of the beam can be programmed with software default settings or automatically adapted for an application. In some embodiments, various configurations for the conferencing apparatus, such as tabletop, ceiling, and wall configurations can be automatically identified with the orientation sensor 150 in the conferencing apparatus 100.

FIG. 3 illustrates a top view and a side view of a conference room including participants and a conferencing apparatus 100 disposed on a table and illustrating beams that may be formed by a beamforming microphone array 135 disposed in the conferencing apparatus 100. Beams 321, 322, 323, 324, 325, and 326 can be configured with direction, beamwidth, amplification levels, and interference patterns to obtain quality coverage of participants, 311, 312, 313, 314, 315, and 316, respectively.

Figure 4:
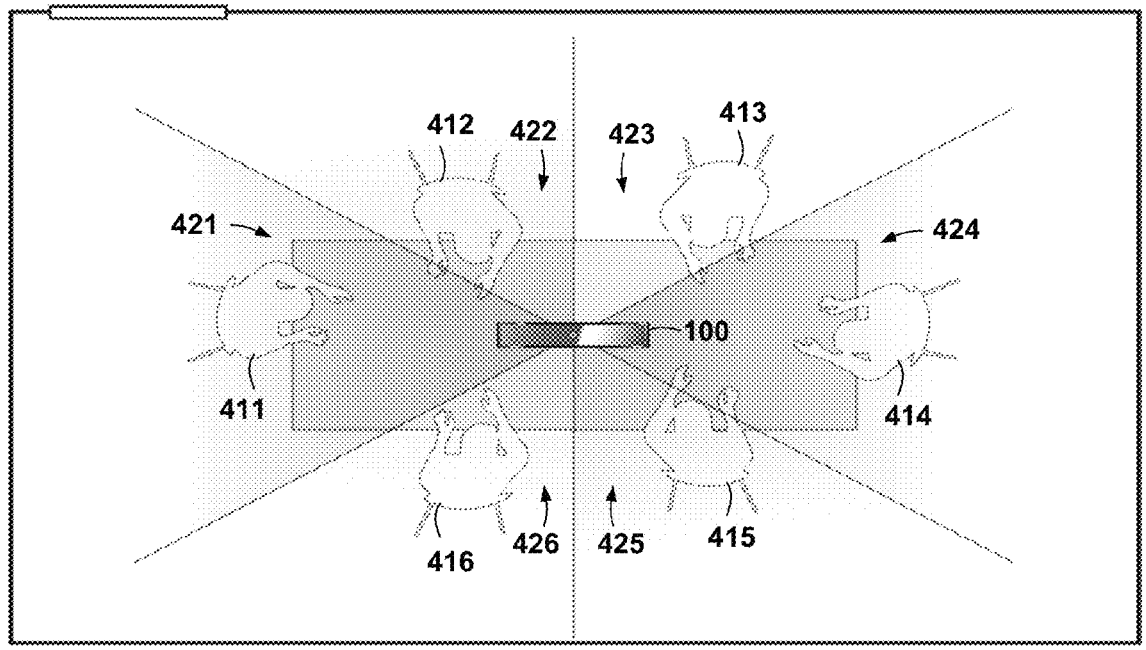
FIG. 4 illustrates a top view and a side view of a conference room including participants and a conferencing apparatus depending from a ceiling and illustrating beams that may be formed by a beamforming microphone array disposed in the conferencing apparatus.
Figure 4:
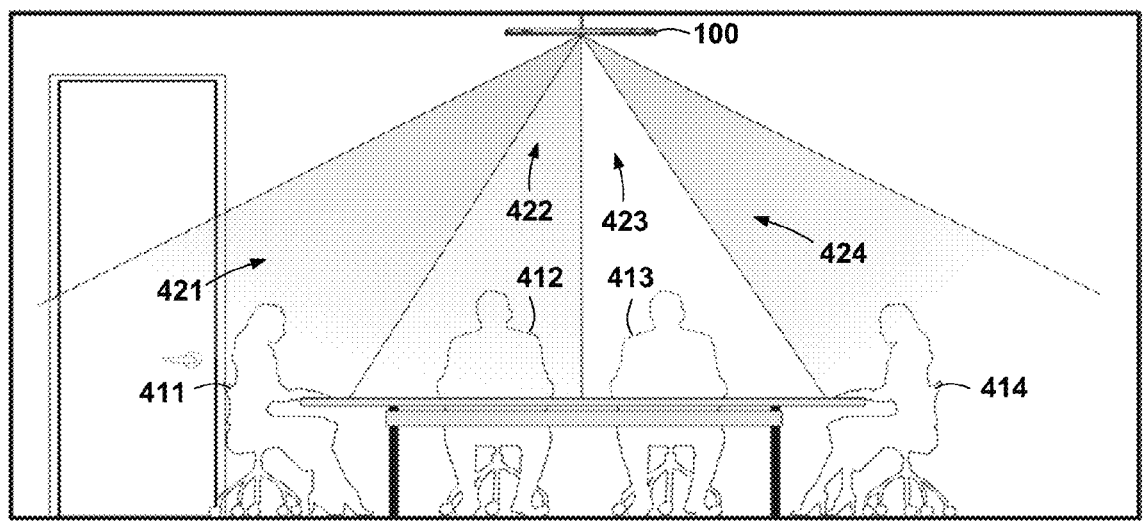

FIG. 4 illustrates a top view and a side view of a conference room including participants and a conferencing apparatus 100 depending from a ceiling and illustrating beams that may be formed by a beamforming microphone array 135 disposed in the conferencing apparatus. Beams 421, 422, 423, 424, 425, and 426 can be configured with direction, beamwidth, amplification levels, and interference patterns to obtain quality coverage of participants, 411, 412, 413, 414, 415, and 416, respectively.

Figure 5:
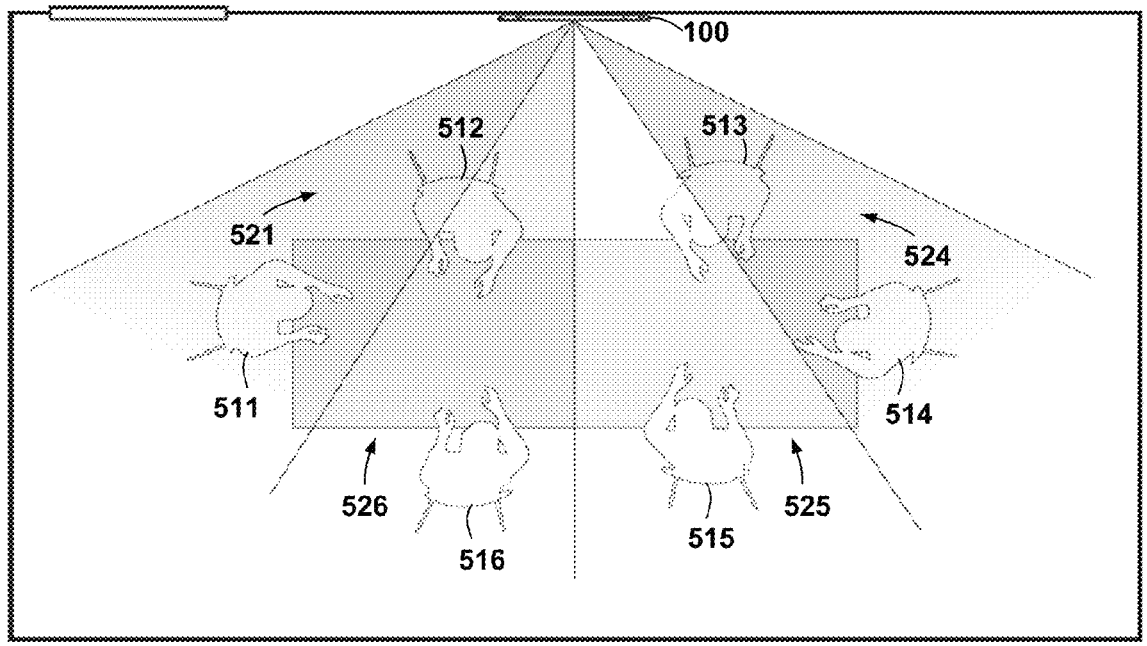
FIG. 5 illustrates a top view and a side view of a conference room including participants and a conferencing apparatus disposed on a wall and illustrating beams that may be formed by a beamforming microphone array disposed in the conferencing apparatus.
Figure 5:
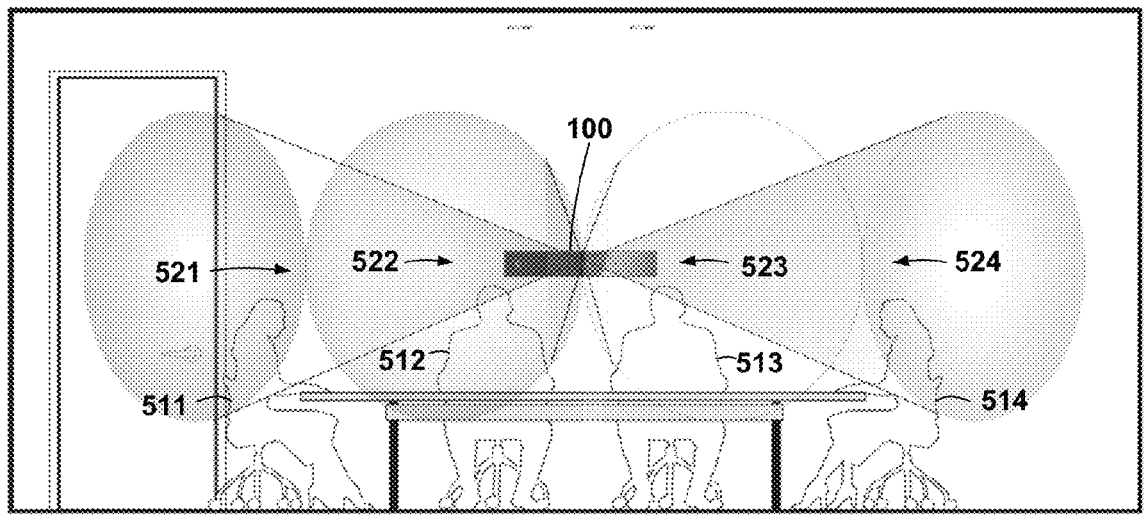

FIG. 5 illustrates a top view and a side view of a conference room including participants and a conferencing apparatus 100 disposed on a wall and illustrating beams that may be formed by the beamforming microphone array 135 disposed in the conferencing apparatus 100. Beams 521, 522, 523, 524, 525, and 526 can be configured with direction, beamwidth, amplification levels, and interference patterns to obtain quality coverage of participants, 511, 512, 513, 514, 515, and 516, respectively.

In FIGS. 3-5, the azimuth angles and beamwidths may be fixed to cover desired regions. As a non-limiting example, the six beams illustrated in FIG. 3 and FIG. 4 can each be configured with beamwidths of 60 degrees with the beamforming microphone array 135. The elevation angle of each beam is designed to cover most people sitting at a table. As a non-limiting example, an elevation angle of 30 degrees may cover most tabletop applications. On the other hand, for a ceiling application, the elevation angle is usually higher as shown in FIG. 4. As a non-limiting example, an elevation angle closer to 60 degrees may be appropriate for a ceiling application. Finally, for a wall application, as shown in FIG. 5, the elevation angle may be appropriate at or near zero degrees.

While these default elevation angles may be defined for each of the orientations, the user, installer, or both, have flexibility to change the elevation angle with software settings at the time of installation, before a conference, or during a conference.

A beamforming microphone array substantially improves audio quality in teleconferencing applications. Furthermore, some embodiments of the present disclosure use a teleconferencing solution with a beamforming microphone array that incorporates acoustic echo cancelation (AEC) to enhance full duplex audio quality.

For high quality in teleconferencing applications, audio of the far-end participant picked up by microphones of the beamforming microphone array 135 can be canceled before transmitting. This is achieved by an acoustic echo canceler (AEC) that uses the loudspeaker audio of the far-end participant as a reference. In the case of the beamforming microphone array 135, there are multiple ways of doing acoustic echo cancelation in combination with beamforming.

Two strategies, "AEC first" and "beamformer first," have been proposed to combine an acoustic echo canceler with a beamforming microphone array. The "beamformer first" method performs beamforming on microphone signals and subsequently echo cancelation is applied on the beamformed signals. The "beamformer first" method is relatively computational friendly but requires continuous learning in the echo canceler due to changing characteristics of the beamformer. Often these changes renders the "beamformer first" method impractical for good conferencing systems.

On the other hand, an "echo canceler first" system applies echo cancelation on each microphone signal and subsequently beamforming is applied on the echo canceled signals. The "AEC first" system provides better echo cancelation performance but is computationally intensive as the echo cancelation is applied for every microphone in the microphone array. The computational complexity increases with an increase in the number of microphones in the microphone array. This computational complexity often limits the number of microphones used in a microphone array and therefore prevents achievement of the substantial benefit from the beamforming algorithm with more microphones.

Embodiments of the present disclosure implement a conferencing solution with beamformer and echo canceler in a hybrid configuration with a "beamformer first" configuration to generate a number of fixed beams followed by echo cancelers for each fixed beam. This hybrid configuration allows an increase in the number of microphones for better beamforming without the need for additional echo cancelers as the number of microphones is increased. Also, the echo cancelers do not need to continually adapt because as the number of fixed beams may be held constant. Therefore, embodiments of the present disclosure provide good echo cancelation performance and the increase in the computational complexity for large number microphones is smaller than the "AEC first" methods.

Figure 6:
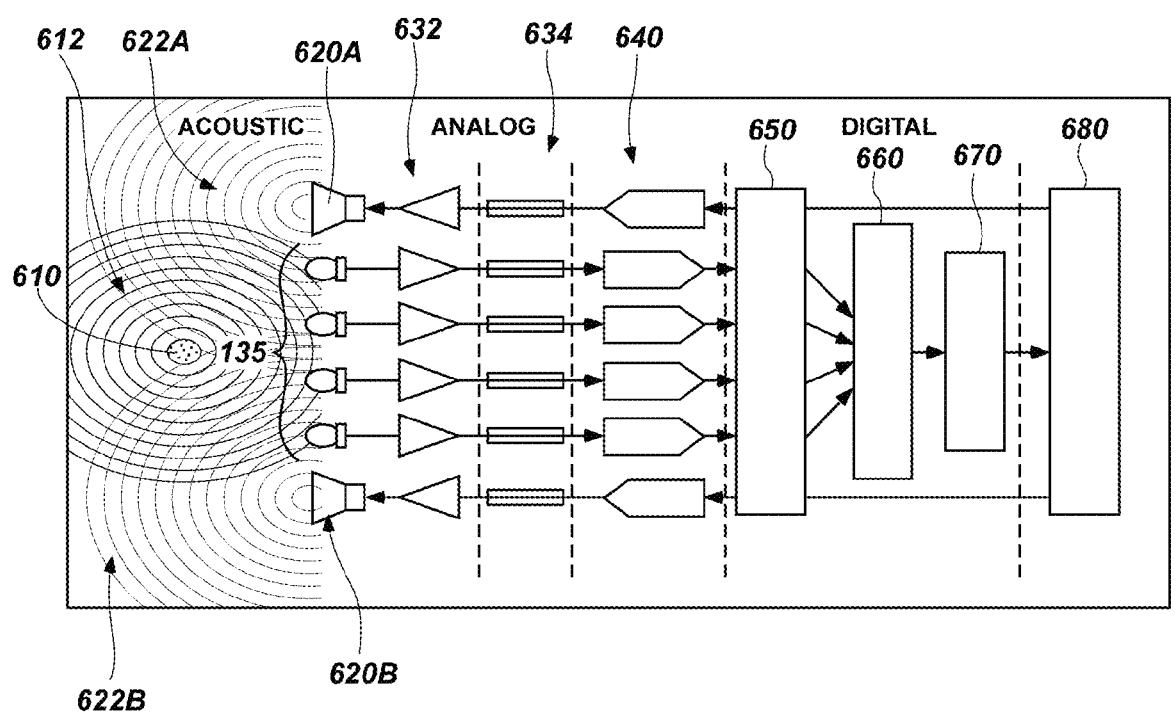
FIG. 6 illustrates elements involved in sensing acoustic waves with a plurality of microphones and signal processing that may be performed on the sensed acoustic waves.

FIG. 6 illustrates elements involved in sensing acoustic waves with a plurality of microphones and signal processing that may be performed on the sensed acoustic waves. In an acoustic environment on the left of FIG. 6, an acoustic source 610 (e.g., a participant) may generate acoustic waves 612. In addition, speakers 620A and 620B may generate acoustic waves 622A and 622B, respectively. A beamforming microphone array 135 senses the acoustic waves (612, 622A, and 622B). Amplifiers 634 may filter and modify the analog signals to the speakers 620A and 620B and from the beamforming microphone array 135. Converters 640 in the form of analog-to-digital converters and digital-to-analog converters convert signals between the analog domain and the digital domain. Various signal-processing algorithms may be performed on the digital signals, such as, for example, acoustic echo cancelation 650, beamforming 660, and noise suppression 670. Resulting digital signals may be then transmitted, such as, for example through a voice over Internet Protocol application 680.

Broadly, two configurations for the signal processing may be considered: "beamformer first" and "echo canceler first." FIG. 5 illustrates an echo canceler first configuration. The following discussion concentrates primarily on the signal processing operations and how beamforming and acoustic echo cancelation may be performed in various configurations. Generally, in FIGS. 7 through 9 thicker lines represent multichannel signals with the number of lines illustrated, whereas thinner lines represent a single channel signal.

Figure 7:
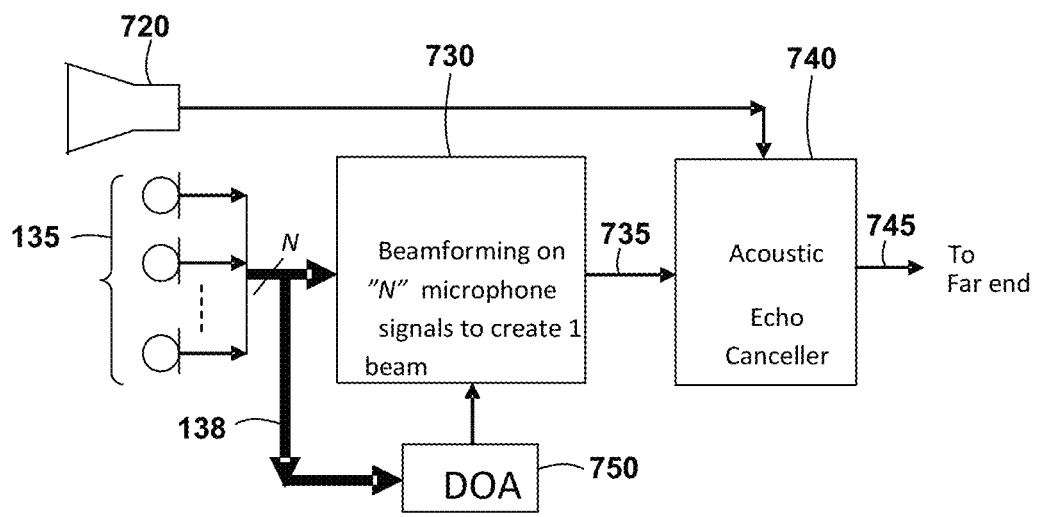
FIG. 7 illustrates processing involved in sensing acoustic waves wherein signals from all of the microphones are combined, then acoustic echo cancelation is performed on the combined signal to create a combined echo canceled signal.

FIG. 7 illustrates processing involved in sensing acoustic waves wherein signals from all of the microphones are combined, then acoustic echo cancelation is performed on the combined signal to create a combined echo canceled signal. The beamforming microphone array 135 generates a set of N microphone signals 138. This "beamformer first" configuration uses the microphone signals 138 to define a beam in the direction indicated by a direction-of-arrival (DOA) determination process 750. The DOA determination process 750 directs a beamforming process 730 to properly combine the microphone signals 138 into a combined signal 735. An acoustic echo canceler 740 then performs acoustic echo cancelation on the combined signal 735 to create a combined echo-canceled signal 745.

Figure 8:
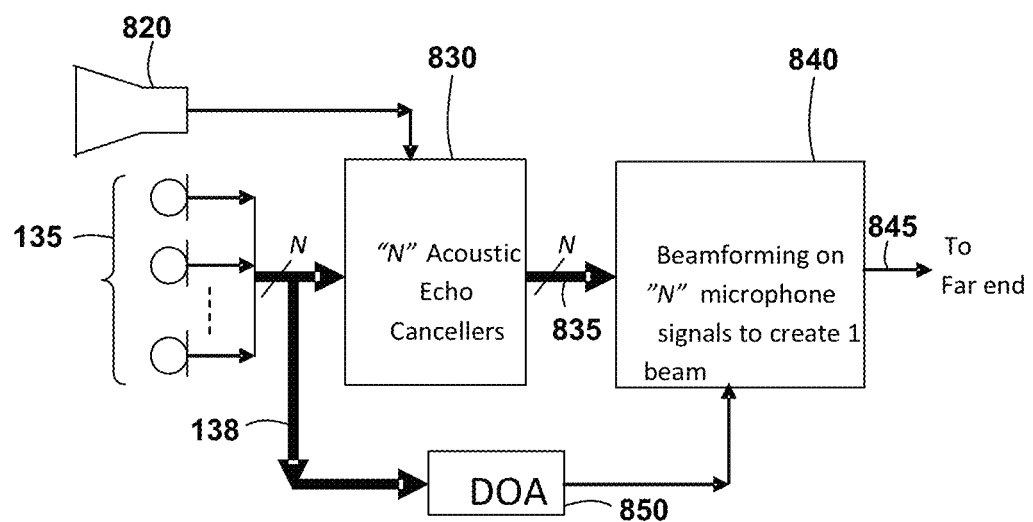
FIG. 8 illustrates processing involved in sensing acoustic waves wherein acoustic echo cancelation is performed on signals from each of the microphones, then the echo canceled signals are combined, to create a combined echo canceled signal.

FIG. 8 illustrates processing involved in sensing acoustic waves wherein acoustic echo cancelation is performed on signals from each of the microphones, then the echo canceled signals are combined, to create a combined echo-canceled signal. The beamforming microphone array 135 generates a set of N microphone signals 138. In this "AEC first" configuration, an acoustic echo cancel process 830 performs acoustic echo cancelation on each microphone signal 138 separately. Thus, a set of N echo-canceled signals 835 are presented to a beamforming process 840. A DOA determination process 850 directs a beamforming process 840 to properly combine the echo-canceled signals 835 into a combined echo-canceled signal 845. Since echo is canceled beforehand in the "AEC first" method, the echo canceler performance is not affected by beam switches. On the other hand, the "AEC first" configuration first cancels the echo from the audio of each microphone and the beam is created from N echo-canceled signals in the direction pointed to by the DOA determination process 850. In terms of spatially filtering the audio, both configurations are substantially equivalent.

However, echo cancelation performance can be significantly different from one application to another. Specifically, as the beam is moving, the echo canceler needs to readjust. In a typical conferencing situation, talker directions keep switching and, therefore, the echo canceler needs to readjust, which may result into residual echo in the audio sent to the far end.

While the "AEC first" configuration provides acceptable performance for the beamformer/AEC implementation, the computational complexity of this configuration is significantly higher than the "beamformer first" configuration. Moreover, the computation complexity to implement the "AEC first" configuration increases significantly as the number of microphones used to create beam increases. Therefore, for given computational complexity, the maximum number of microphones that can be used for beamforming is lower for the "AEC first" configuration than the "beamformer first" configuration. Using comparatively more number of microphones can increase audio quality of the participants, especially when a participant moves farther away from the microphones.

Figure 9:
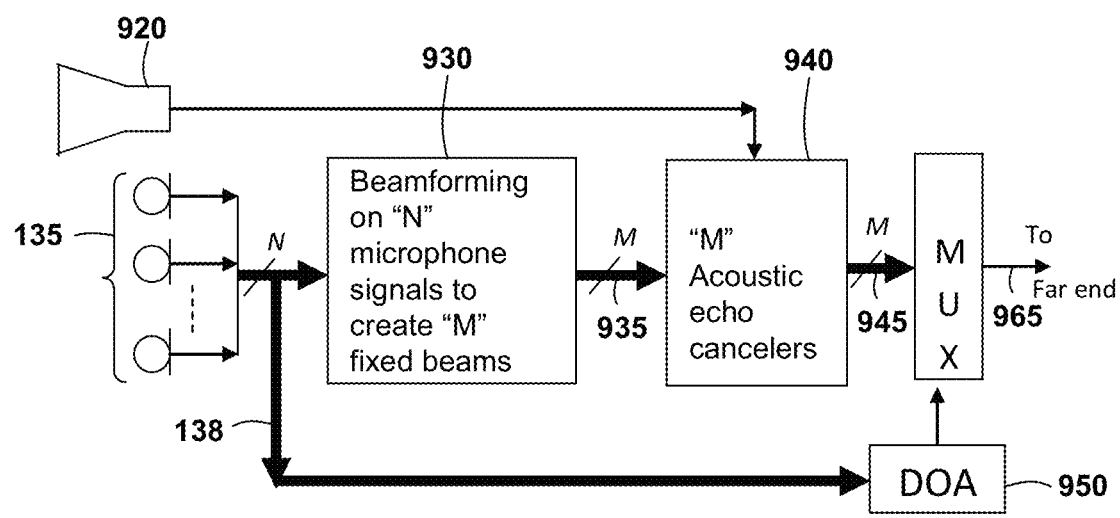
FIG. 9 illustrates processing involved in sensing acoustic waves wherein a subset of signals from the microphones are combined, then acoustic echo cancelation is performed one or more of the combined signals.

FIG. 9 illustrates processing involved in sensing acoustic waves wherein a subset of signals from the microphones are combined, then acoustic echo cancelation is performed one or more of the combined signals. The beamforming microphone array 135 generates a set of N microphone signals 138. In this hybrid configuration, a beamforming process 930 forms M fixed beams 935 from N microphone signals 138. An acoustic echo cancel process 940 performs acoustic echo cancelation on each of the M fixed beams 935 separately. As a result M combined echo-canceled signals 945 are generated. A multiplexer 960 controlled by the DOA determination process 950 selects one or more of the M combined echo-canceled signals 945 as final output signals 965.

In order to balance computation complexity of the complete system and number of microphones to do beamforming, the configuration of FIG. 9 creates M combined echo-canceled signals 945 to present as the final output signals 965.

In teleconferencing application including beamforming, increasing the number of beams does not add as much benefit as increasing the number of microphones. Therefore, while a large number of microphones may be used to create good beam pattern in the hybrid configuration, the increase in computational complexity due to additional echo cancelers is significantly smaller than the "AEC first" configuration. Furthermore, since the beam is selected after the echo cancelation, echo cancelation performance is not affected due to change in the beam location. It should be noted that the number of echo cancelers does not need to change with a changing number of microphones. Furthermore, since the beamforming is done before the echo cancelation, the echo canceler also performs better than the "AEC first" setup.

Figure 10:
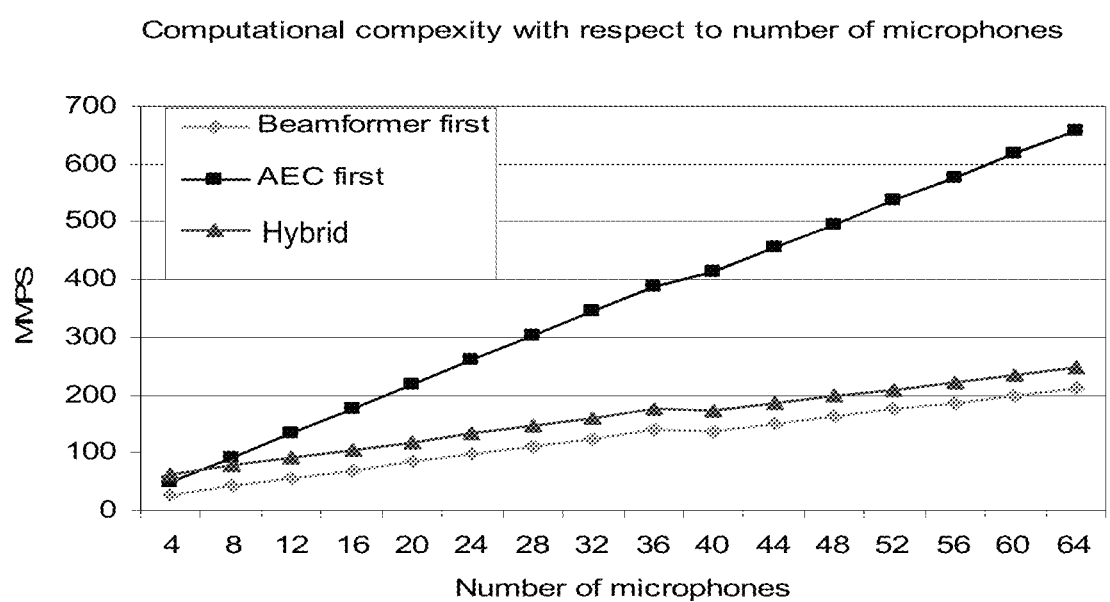
FIG. 10 illustrates computational complexity of various embodiments relative to number of microphones in a beamforming microphone array.

FIG. 10 illustrates computational complexity of various embodiments relative to number of microphones in a beamforming microphone array. The computational complexity for various configurations and number of microphones was calculated in terms of required million-multiplications per second (MMPS) and is shown in FIG. 10. It can be seen that the computational complexity for all methods increase as the number of microphones increase. However, the increase in the computational complexity for the "beamformer first" configuration and the hybrid configuration is much smaller than that of the "AEC first" configuration. With low computational complexity, and the fact that the implementation of the hybrid configuration has less chance of errors in the echo cancelation as a talker's direction switches, the hybrid configuration a good balance between quality and computational complexity for audio conferencing systems.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of echo cancellation for a conferencing application, comprising:
sensing acoustic waves with a plurality of microphones to develop a corresponding plurality of microphone signals;
performing a beamforming operation to combine the plurality of microphone signals to a plurality of combined signals that is greater in number than one and less in number than the plurality of microphone signals, each of the plurality of combined signals corresponding to a different fixed beam;

performing an acoustic echo cancelation operation on the plurality of combined signals to generate a plurality of combined echo-canceled signals; and selecting one or more of the plurality of combined echo-canceled signals for transmission.

2. The method of claim 1, further comprising performing a direction-of-arrival determination on the plurality of microphone signals and wherein selecting one or more of the plurality of combined echo-canceled signals is performed responsive to the direction-of-arrival determination.

3. The method of claim 1, wherein sensing the acoustic waves with the plurality of microphones comprises sensing the acoustic waves with a beamforming microphone array.

4. The method of claim 1, further comprising noise filtering the plurality of combined signals prior to performing the acoustic echo cancelation operation.

5. The method of claim 1, further comprising noise filtering the selected one or more of the plurality of combined echo-canceled signals.

6. The method of claim 1, further comprising transmitting the selected one or more of the plurality of combined echo-canceled signals.

7. The method of claim 1, further comprising:
sensing an orientation of a housing bearing the plurality of microphones; and
automatically adjusting a signal-processing characteristic of one or more of the microphones responsive to the sensed orientation.

8. A conferencing apparatus, comprising:
a plurality of microphones oriented to cover a plurality of direction vectors to develop a corresponding plurality of microphone signals; and
a processor operably coupled to the plurality of microphones and configured to:
perform a beamforming operation to combine the plurality of microphone signals to a plurality of combined signals that is greater in number than one and less in number than the plurality of microphone signals, each of the plurality of combined signals corresponding to a different fixed beam;
perform an acoustic echo cancelation operation on the plurality of combined signals to generate a plurality of combined echo-canceled signals; and
select one or more of the plurality of combined echo-canceled signals for transmission.

9. The conferencing apparatus of claim 8, wherein the processor is further configured to perform a direction-of-arrival determination on the plurality of microphone signals and wherein selecting one or more of the plurality of combined echo-canceled signals is performed responsive to the direction-of-arrival determination.

10. The conferencing apparatus of claim 8, wherein the plurality of microphones are configured as a beamforming microphone array.

11. The conferencing apparatus of claim 8, wherein the processor is further configured to noise filter the selected one or more of the plurality of combined echo-canceled signals.

12. The conferencing apparatus of claim 8, wherein the processor is further configured to noise filter the plurality of combined signals prior to performing the acoustic echo cancelation operation.

13. The conferencing apparatus of claim 8, wherein the processor is further configured to transmit the selected one or more of the plurality of combined echo-canceled signals.

14. The conferencing apparatus of claim 8, further comprising an orientation sensor configured to generate an orientation signal indicative of an orientation of a housing bearing the plurality of microphones and wherein the processor is further configured to execute the computing instructions to automatically adjust a signal-processing characteristic of one or more of the microphones responsive to the orientation signal.

15. A conferencing apparatus, comprising:
a beamforming microphone array for developing a plurality of microphone signals, each microphone of the beamforming microphone array is configured to sense acoustic waves from a direction vector substantially different from other microphones in the beamforming microphone array;
a memory configured for storing computing instructions; and
a processor operably coupled to the beamforming microphone array and the memory, the processor configured to execute the computing instructions to:
perform a beamforming operation to combine the plurality of microphone signals to a plurality of combined signals that includes a number of signals between one and a number of signals in the plurality of microphone signals, each of the plurality of combined signals corresponding to a different fixed beam; and
perform an acoustic echo cancelation operation on the plurality of combined signals to generate a plurality of combined echo-canceled signals.

16. The conferencing apparatus of claim 15, wherein the processor is further configured to perform a direction-of-arrival determination on the plurality of microphone signals and select one or more of the plurality of combined echo-canceled signals responsive to the direction-of-arrival determination.

17. The method of claim 16, further comprising transmitting the selected one or more of the plurality of combined echo-canceled signals.

18. The conferencing apparatus of claim 15, further comprising an orientation sensor configured to generate an orientation signal indicative of an orientation of the beamforming microphone array and wherein the processor is further configured to execute the computing instructions to automatically adjust a signal-processing characteristic of one or more of the microphones responsive to the orientation signal.

19. The conferencing apparatus of claim 18, wherein the processor is further configured to execute the computing instructions to automatically adjust a number of the microphones participating in the beamforming microphone array responsive to the orientation signal.

20. The conferencing apparatus of claim 18, wherein the processor is further configured to execute the computing instructions to automatically adjust at least one microphone of the beamforming microphone array by adjusting a signal-processing characteristic selected from the group consisting of an amplification level, the direction vector, an interference pattern with another directional microphone of the beamforming microphone array, or a combination thereof.

* * * * *

UNITED STATES PATENT AND TRADEMARK OFFICE
CERTIFICATE OF CORRECTION

| | | |
|---|---|---|
| PATENT NO. | : 9,264,553 B2 | Page 1 of 1 |
| APPLICATION NO. | : 13/493921 | |
| DATED | : February 16, 2016 | |
| INVENTOR(S) | : Ashutosh Pandey et al. | |

It is certified that error appears in the above-identified patent and that said Letters Patent is hereby corrected as shown below:

In the specification

In column 6, line 51, delete "that that" and insert -- that --, therefor.

In column 8, line 55, delete "622B," and insert -- 622B --, therefor.

In the claims

In column 12, line 39, in claim 17, delete "method" and insert -- conferencing apparatus --, therefor.

Signed and Sealed this
Tenth Day of May, 2016

Michelle K. Lee
*Director of the United States Patent and Trademark Office*